(12) United States Patent
Mirowski et al.

(10) Patent No.: US 8,463,291 B2
(45) Date of Patent: Jun. 11, 2013

(54) KL-DIVERGENCE KERNEL REGRESSION FOR NON-GAUSSIAN FINGERPRINT BASED LOCALIZATION

(75) Inventors: Piotr Mirowski, New York, NY (US); Harald Steck, New Providence, NJ (US); Philip A. Whiting, New Providence, NJ (US); Ravishankar Palaniappan, Jersey City, NJ (US); William Michael MacDonald, Bridgewater, NJ (US); Tin Kam Ho, Millburn, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/249,895

(22) Filed: Sep. 30, 2011

(65) Prior Publication Data

US 2013/0065605 A1     Mar. 14, 2013

Related U.S. Application Data

(60) Provisional application No. 61/533,994, filed on Sep. 13, 2011.

(51) Int. Cl.
    *H04W 24/00*      (2009.01)
(52) U.S. Cl.
    USPC ........................... 455/456.1; 455/457
(58) Field of Classification Search
    USPC ............... 455/456, 456.1; 382/190, 103, 118, 382/181; 707/10, 737; 706/12; 709/200
    See application file for complete search history.

(56) References Cited

U.S. PATENT DOCUMENTS

| | | | | |
|---|---|---|---|---|
| 2002/0155845 | A1* | 10/2002 | Martorana | 455/456 |
| 2008/0214205 | A1* | 9/2008 | Alles et al. | 455/456.1 |
| 2008/0313188 | A1* | 12/2008 | Hu et al. | 707/10 |

OTHER PUBLICATIONS

Ioannis C. Paschalidis et al, "Model-Free Probabilistic Localization of Wireless Sensor Network Nodes in Indoor Environments", Sep. 30, 2009, Mobile Entity Localization and Tracking in GPS-Less Environments, Springer Berlin Heidelberg, Berlin, Heidelberg, XP019130801, pp. 66-78.

Antoni B. Chan et al, "A Family of Probabilistic Kernels Based on Information Divergence", Statistical Visual Computing Lab, Department of Electrical and Computer Engineering, University of California, San Diego, Jun. 30, 2004, retrieved from the internet on Oct. 26, 2012: http://www.svcl.ucsd.edu/publications/techreports/SVCL-TR-2004-01.pdf, 11 pages.

Ville Honkavirta et al, "A Comparative Survey of WLAN Location Fingerprinting Methods", Proceedings of the 6th Workshop on Positioning, Navigation and Communication, 2009, IEEE, Piscataway, NJ, USA. Mar. 19, 2009, pp. 243-251.

Piotr Mirowski et al, "KL-Divergence Kernel Regression for Non-Gaussian Fingerprint Based Localization", Indoor Positioning and Indoor Navigation (IPIN), 2011 International Conference on IEEE, Sep. 21, 2011, XP031990143, 10 pages.

PCT International Search Report dated Nov. 9, 2012 (PCT/US2012/053899) 3 pages.

* cited by examiner

*Primary Examiner* — Kiet Doan
(74) *Attorney, Agent, or Firm* — Julie Stein; Niraj Desai

(57) ABSTRACT

Embodiments are directed to mobile localization, and more specifically, but not exclusively, to tracking mobile devices. Embodiments include methods that consider probability kernels with distance-like metrics between distributions. Also described are probabilistic kernels that can be used for a regression of location, which can achieve up to about inn accuracy in an office environment.

20 Claims, 13 Drawing Sheets

KL-DIVERGENCE KERNEL REGRESSION FOR NON-GAUSSIAN FINGERPRINT BASED LOCALIZATION

CROSS-REFERENCE

This application claims the benefit of U.S. provisional application KL-Divergence Kernel Regression for Non-Gaussian Fingerprint Based Localization, No. 61/533,994, filed Sep. 13, 2011, which is herein incorporated in its entirety, by reference.

FIELD OF THE INVENTION

The present invention is directed to mobile localization, and more specifically, but not exclusively, to tracking mobile devices.

BACKGROUND OF THE INVENTION

This section introduces aspects that may be helpful in facilitating a better understanding of the invention. Accordingly, the statements of this section are to be read in this light and are not to be understood as admissions about what is in the prior art or what is not in the prior art.

Various methods have been developed for indoor localization using WLAN signals. Algorithms that fingerprint the Received Signal Strength Indicators (RSSI) of WiFi for different locations can achieve tracking accuracies on the order of a few meters. However, RSSI fingerprinting suffers from two main limitations: first, as the signal environment changes, so does the fingerprint database, which requires regular updates; and second it has been reported that in practice, certain devices record more complex (e.g., bimodal) distributions of WiFi signals, precluding algorithms based on the mean RSSI.

As a first step, localization methods require laborious human involvement in the training phase to build so-called "fingerprint" maps for each Access Point (AP). In predictive mode, the RSSI from visible APs are matched to the fingerprints to estimate the location of a person or object. Typical algorithms such as nearest neighbor matching may involve solely the RSSI; other techniques can take advantage of time-stamping and of assumptions about the motion, and can resort to state-space models and dynamic system inference. However, fingerprint maps generally store only the mean value of RSSI, not the full distribution of the RSSI, and do not exploit information about the fluctuations of RSSI in the environment.

In addition, certain devices can record more complex distributions, complicating the fingerprinting process and introducing errors at estimation. Moreover, frequent retraining is necessary to maintain accuracy. Also, some APs may no longer be visible during estimation, for instance due to equipment failures or their roles in mobile ad-hoc networks. In addition, none of the previous methods considered probability kernels with distance-like metrics between distributions.

Therefore, there is a need for a simple methodology that takes into account the full distribution for computing similarities among fingerprints.

SUMMARY OF THE INVENTION

The aspects described above and other aspects of the subject matter described herein are illustrated by way of example and not limited in the accompanying figures in which like reference numerals indicate similar elements.

Embodiments of the present invention are directed to mobile localization, and more specifically, but not exclusively, to tracking mobile devices. Embodiments include methods that consider probability kernels with distance-like metrics between distributions. Also described are probabilistic kernels that can be used for a regression of location, which can achieve up to about 1 m accuracy in an office environment.

Embodiments provide a methodology that takes into account the full distribution for computing similarities among fingerprints using Kullback-Leibler divergence and that perform localization through kernel regression. Various examples are provided, including using RSSI distributions and/or access point presence to estimate the location of a mobile device.

Embodiments include, a method of estimating the location of a device, comprising sampling a measurement distribution p of a parameter of the device for a predetermined duration, by a processor, and comparing the sampled measurement distribution p to a database of distributions $q_{1\ to\ L}$ using a symmetrized Kullback-Leibler (K-L) divergence D. The method also can include constructing a kernel function $k(p,q)$ using the K-L divergence D between the measured sample distribution p and a database distribution $q_i$ component across all $q_{1\ to\ L}$ and performing a weighted regression using the constructed kernel function. The method can further include, estimating the location of the device based on the performed weighted regression of the constructed kernel function.

In additional embodiments, the sampling can be repeated at different locations, $p_{x,y}$. In other embodiments, for each $p_{x,y}$, the comparing, constructing, performing, and estimating steps can be performed. Also the measurement parameter can be signal strength and/or access point presence. In various embodiments, the predetermined duration can range from approximately 1 second to approximately 20 seconds. In other embodiments, the symmetrized KL divergence D can be defined as: $D(p,q)=KL(p\|q) KL(q\|p)$. In still other embodiments, constructing the kernel, can further comprise exponentiating the symmetrized KL divergence D. In additional embodiments, performing a weighted regression can use K nearest neighbors and the database can comprise a set of previously mapped measurement distributions for the device parameter.

The various embodiments described can also be recorded on tangible computer recordable mediums in code that is executable to instruct a processor to perform the various steps.

DESCRIPTION OF THE EMBODIMENTS

Present embodiments are directed to probability kernel-based approaches to matching fingerprints, where each fingerprint is associated with a location in a fingerprint database. Matching can be done by comparing distributions using a symmetrized Kullback-Leibler divergence and by constructing probability kernels that can be used in simple weighted regression schemes. It was found that this metric on fingerprints is robust to various noise and RSSI distributions, and can provide methods to estimate the location using RSSI measurements during a short time window. In other embodiments, alternative approaches to fingerprinting can record the count of successful connections to APs (rather than the RSSI levels) over a small time interval.

Embodiments include simple probabilistic methods for WLAN fingerprint-based tracking, relying on location regression with KL-divergence kernels. The time-window based sampling approach is a simple way to account both for the motion and for the complex non-Gaussian distributions of RSSI.

As used herein, mobile can include, for example, mobile devices, user equipment (UE), laptops, mobile computers, smart-phones, etc. Also, as used herein, access point (AP) is intended to include any node within a communications network that is configured to communicate with a mobile, including other mobiles. APs can include, for example, WiFi capable devices, WiMax capable devices, wireless communication nodes (mobiles, RNCs, NodeBs, Base stations, etc.).

Figure 1:
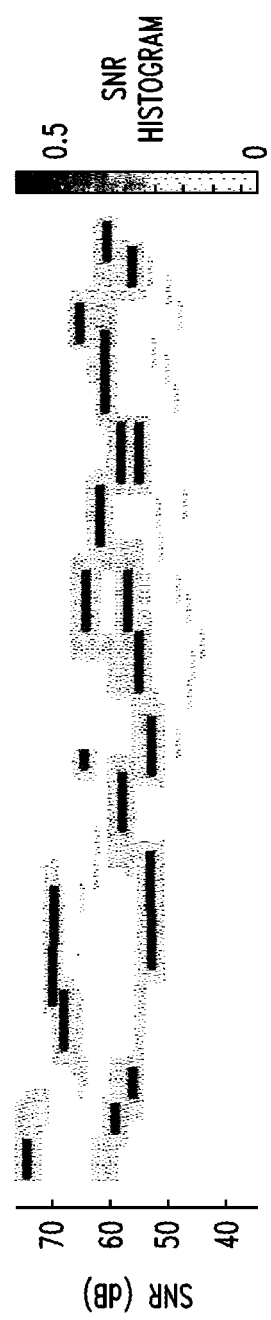
FIG. 1 is a graph of RSSI signal distributions, according to embodiments.

A common assumption about the RSSI coming from multiple APs is that the signals are distributed as multivariate Gaussians. It has however been reported that this is not always the case: the signal can be multimodal, or different recording devices can measure quite different distributions at the same location. A shown in FIG. 1, the RSSI can be distributed in a bimodal way, oscillating between two values distant by as much as about 10 dB. Presumably, the use of mean and variance of a multimodal distribution ignores important information that is helpful for discriminating among different locations. Therefore, present embodiments include procedures that can provide a richer characterization of the distribution. The RSSI or Signal-to-Noise Ratio (SNR) distributions can be represented by histograms. For example, because the RSSI values recorded by such software as NetStumbler® (http://www.netstumbler.com) are integers, a natural binning scheme of one bin for each integer level 1 can be used. In the most general case that can account for the multi-modality of the signals, multinomial distributions can be considered as the model for RSSI distributions. In order to compare such multimodal distributions, the Kullback-Leibler (KL) divergence can be used.

Present embodiments are directed to probability kernel-based approaches to matching fingerprints, where each fingerprint is associated with a location in a fingerprint database. Matching can be done by comparing distributions using a symmetrized Kullback-Leibler divergence and by constructing probability kernels that can be used in simple weighted regression schemes. It was found that this metric on fingerprints is robust to various noise and RSSI distributions, and can provide means to estimate the location using RSSI measurements during a short time window. In other embodiments, alternative approaches to fingerprinting can record the count of successful connections to APs (rather than the RSSI levels) over a small time interval.

Embodiments include sampling a distribution p of RSSI from all visible APs for a duration τ (typically a few seconds), and comparing it to the distributions q in the fingerprint database, using the Kullback-Leibler divergence and the KL-divergence kernel. In the fingerprint database, each fingerprint can be associated with a location. The location can be estimated through kernel regression. Embodiments can also be applied to histograms of AP connections (i.e. binary) instead of full RSSI levels.

Kullback-Leibler Divergence

In information theory, the Kullback-Leibler divergence KL is a non-symmetric measure of the difference between two probability distributions p and q. In the discrete case where the random variable S takes discrete values (e.g. integer-valued RSSI or SNR from an access point), the KL of p, q is: $KL(p\|q)=\Sigma_s p(S=s)\log(p(S=s)/q(S=s))$. To avoid taking logarithms of zero-valued bins, the distribution can be smoothed by adding a small constant term (e.g. $10^6$) and re-normalizing the empirical distribution function. The symmetrized Kullback-Leibler divergence D between two distributions p and q can be simply defined as $$D(p,q)=KL(p\|q)+KL(q\|p) \qquad (1)$$

In the case when the discrete random vector $\{S_1, \ldots, S_j\}$ is multivariate (e.g. when measuring RSSI from multiple access points $\{1, \ldots, J\}$), an assumption of local independence can be made of each AP's distribution, i.e. that $p(S|\{x,y\})=\Pi_{j=1}^{J} p(S_j|\{x,y\})$ at specific location $\{x,y\}$. Note that the shorthands $p=p(S|\{x,y\})$ is now used to express the RSSI distribution obtained during tracking and around position $\{x,y\}$, and $q_l=q(S|\{x_l,y_l\})$ to express the RSSI distribution at the fingerprint indexed by l. Using the chain rule for relative entropy, the KL-divergence of a joint distribution of independent variables can equal the sum of the KL-divergences for each variable's distribution. Therefore, for any two locations $\{x,y\}$ and $\{x_l,y_l\}$ and their associated multivariate distributions p and $q_l$, and for J access points:

$$D(p, q_l) = \sum_{j=1}^{J} D(p(S_j | \{x, y\}), q(S_j | \{x_l, y_l\})) \qquad (2)$$

Embodiments are directed to combining the KL-divergence with kernel methods and to use kernel-based regression algorithms. Briefly, a kernel function k(p, q) is a symmetric function equal to one if p=q and decaying to zero as the dissimilarity of the two inputs increases. Kernel methods such as Support Vector Regression often require the kernel matrix between all training data points to be Positive Semi-Definite (PSD). A real-valued symmetric matrix $K \in \Re^{n \times n}$ is positive semi-definite if for all vectors $X \in \Re^n$, $x^T K x \geq 0$ For data-dependent range of values α, it is possible to define such PSD kernels by exponentiating the symmetrized KL-divergence:

$$k(p, q_l) = e^{-\alpha \sum_{j=1}^{J} D(p(S_j|\{x,y\}),q(S_j|\{x_l,y_l\}))} \qquad (3)$$

When the signal fingerprint at location $\{x,y\}$ does not sample any RSSI from a specific $AP_j$, the distribution can be set to $p(S_j=-\infty|\{x, y\})=1$. This can be approximated by putting all the mass on the first bin of the histogram (typically the bin below the limit of detection). When an AP is "unknown" both to the current sample p and to training fingerprint $q_k$ then $D(p(S_j), q_l(S_j))=0$, i.e., the j-th AP in the kernel regression can be ignored. However, if that AP is sampled by p and by a fingerprint $q_l$ but not by another fingerprint $q_m$, then the KL-divergence for that AP can be smaller between p and $q_l$ than it is between p and $q_m$, giving more kernel weight to the fingerprint who "knows" that AP.

An alternative approach is to consider that when one distribution is defined but not the other, then the two distributions can be infinitely different (i.e. their KL-divergence can be equal to infinity). Instead of using infinite values, a large constant can be used that is equal to the maximum KL-divergence that can be obtained for that number of bins and for that smoothing coefficient, multiplied by a factor. In most cases, a factor of 1 can be used (again, obtaining similar numerical results as by setting $p(S_j=-\infty|\{x, y\})=1$), and factors bigger than 1 (e.g. 4) can be used when the area covered by the fingerprints is very large, resulting in many APs not being "heard" in different parts of the map. Finally, when it appears that an AP is down and is never sampled, it can be simply removed from the sum in the kernel function exponent (Eq. 3).

KL-Divergence Kernel Regression

Using the KL-divergence kernel function k and a set of known training data points $q^{\{x_l, y_l\}}$, a Weighted Kernel Regression can be performed to obtain an estimate of the location using p, the sampled distribution of RSSI:

$$(\bar{x}, \bar{y}) = \frac{\sum_l (x_l, y_l) k(p, q_l)}{\sum_l k(p, q_l)} \quad (4)$$

In various embodiments, this regression can be performed using the K nearest neighbors (in the KL-divergence sense), instead of the full set of known training data points, i.e. to keep the K fingerprints $\{q_l\}$ that maximize $k(p,q_l)$. In embodiments, nearest neighbor matching can amount to a case where K=1. Note that the choice of the K neighbors depends on the test data point p, and that the kernel function still needs to be evaluated for all known fingerprints. Hyperparameters $\alpha$ and K on the training dataset (i.e. on the fingerprints), can be optimized for instance using leave-one-out cross-validation. Kernels can provide a simple way to interpolate the location estimates between fingerprint locations.

In real scenarios, the distribution p for which one may wish to estimate the location is going to be sampled during motion, as the mobile moves through areas with different RSSI distributions. A crucial assumption made for estimating the location is that the probability distribution functions (PDFs) continuously change for neighboring points. In other words, for two close positions $\{x_a, x_b\}$ and $\{x_a, x_b\}$:

$$q(S|\lambda\{x_a,y_a\}+(1-\lambda)\{x_b,y_b\}) \approx \lambda q_a + (1-\lambda) q_b. \quad (5)$$

Figure 2:
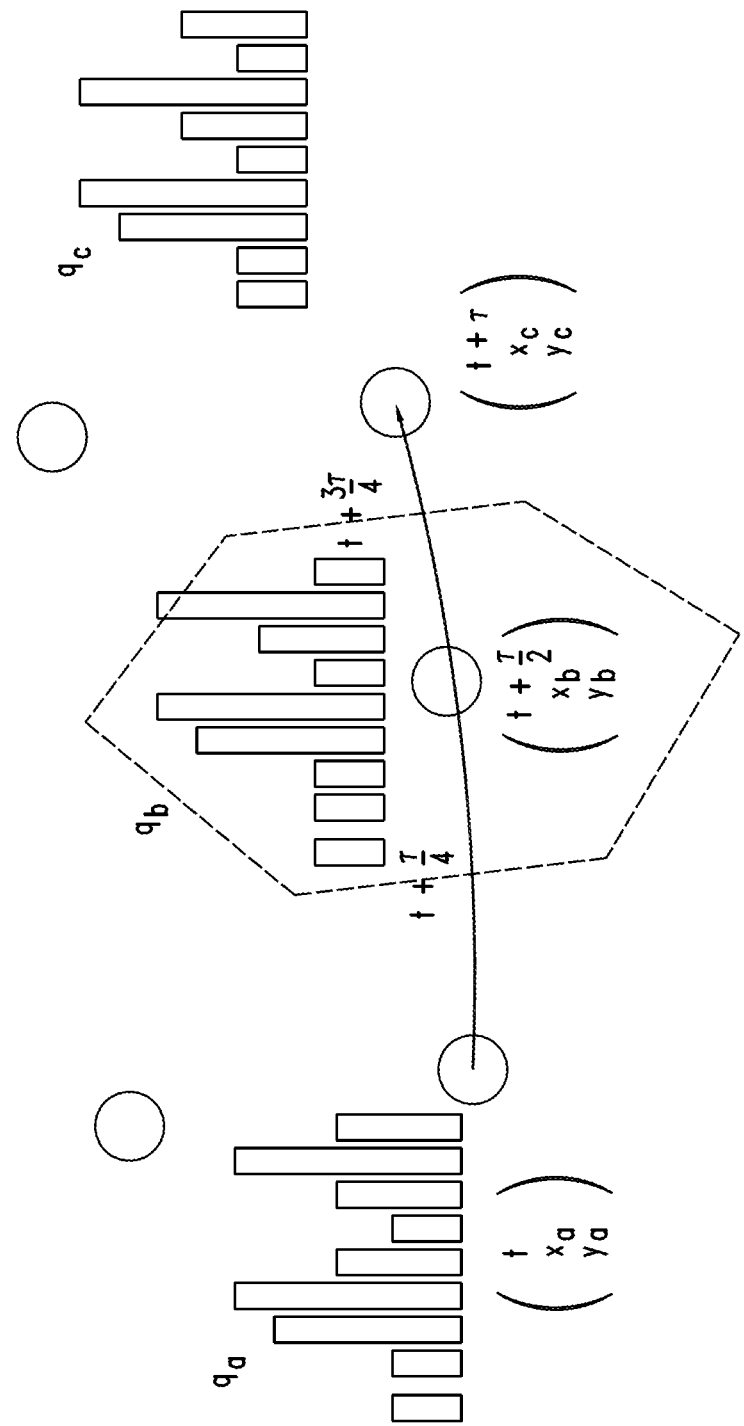
FIG. 2 shows 3 training fingerprints and their corresponding distributions, according to embodiments.

There can be a trade-off between the number of RSSI samples necessary to get a good approximation of p (i.e. the time required $\tau$ and the distance travelled), and the error introduced by sampling from neighboring locations. The latter can be controlled by knowing how adjacent fingerprints are spaced, how frequently APs are queried, and having a prior idea on the speed of motion. For instance, in some embodiments, a time window with $\tau=8$ s was used, while the motion speed was 0.5 m/s, adjacent training fingerprints were spaced every 2-2.5 m, and APs were probed at 5 Hz: this means that the sampling windows covered roughly 2 to 3 training fingerprints and up to 40 RSSI samples, as illustrated in FIG. 2. For comparison, each training fingerprint could have up to 130 samples. As shown in FIG. 2, $\tau$ can be adjusted to cover 3 fingerprints $q_a$, $q_b$, and $q_c$ during tracking. A weighting scheme that involves a smaller weight $$\frac{\kappa}{2}$$

for samples from $q_a$ collected at the beginning $$\left(t, t + \frac{\tau}{4}\right)$$

of the sampling window, and for samples from $q_c$ at the end $$\left(t + \frac{3\tau}{4}, t + \tau\right)$$

of that window, and $1-\kappa$ for samples from $q_b$ in the middle window $$\left(t + \frac{\tau}{4}, t + \frac{3\tau}{4}\right)$$

can be used. $\kappa$ can be determined by cross-validation using a multinomial sampler on the training dataset from three adjacent fingerprints for total duration $\tau$, to be the value that minimizes the KL-divergence between the sampled $$\frac{\kappa}{2} p(S|\{x_a, y_a\}) + 1(1-\kappa) p(S|\{x_b, y_b\}) + \frac{\kappa}{2} p(S|\{x_c, y_c\})$$

and the actual $q_b$. Note that our specific sampling window scheme gives an estimate for the location at $$\frac{\tau}{2} = 4s$$

ago.

A Probabilistic Definition of Fingerprints

Suppose there is a finite set of locations (a location being either a point or a "small" area) and a set of possible discrete measurement values (scalar or vector) from some finite set. The following definition can follow:

Definition 1. Given a finite set of locations L and a finite and discrete measurement set Z (corresponding for instance to values that can be taken by an radio-frequency signal such as the RSSI from a WiFi access point), a fingerprint is defined as a set of probability distributions specific to a location indexed by $$p(S|\{x_l, y_l\}), S \in Z, \forall \{x_l, y_l\} \in L$$

For ease of notation, this can be written as $p_l(S)=p(S|x_l, y_l)$. Fingerprints determine the probability outcomes of measurements, in that if $S_1, \ldots, S_n$ are measurements at an arbitrary sequence of locations $\{x_l, y_l\}, \ldots, \{x_n, y_n\}$, then $$p(S_1, \ldots, S_n | \{x_1, y_1\}) = \prod_{l=1}^{n} p_l(S_l) \qquad (6)$$

As discussed above, embodiments can include measurements taken from WiFi enabled devices which can communicate with access points (AP). In various embodiments, RSSI measurements are used, where there can be J access points and $S \in S = \{s_L, \ldots, s_H\}^J$, where $s_L$ and $s_H$ are the lowest and highest RSSI values, respectively, that can be recorded by the WiFi device and software. In other embodiments it can be determined whether or not an access point is in or out of range, as above, but with $S = \{0, 1\}^J$.

In all of the embodiments either measuring a specific RSSI value s for a specific AP or reporting an access point as being in range, can be evaluated. Intuitively, the probabilities will become more precise if we increase the number of samples N is increased at fingerprinting time (the samples which are used to estimate the distributions.

Device Independent Measurements

In various embodiments it is assumed for purposes of calculation that location outcomes are device independent. In various embodiments different WiFi cards on different laptops can record different sets of RSSI values at identical locations. Nevertheless, an appropriate rescaling can be applied to the distribution of measurements from an RF device relative to another one, in order to compensate for manufacturing differences between the two RF measuring devices.

Motion and Conditional Independence Given the Location

Based on the above definition that states the measurements are conditionally independent given the location, it can be implied that the fingerprints determine the measurement statistics given the sequence of locations at which they are recorded. If the location does not change for an interval of time, then the measurements are theoretically i.i.d. (independently and identically distributed), therefore interchangeable, provided that no other phenomena occur that might disturb the radio-frequency field, such as people passing by or electrical equipment being turned on or off. While it is easy to enforce immobility during fingerprinting (i.e. when building the database of fingerprints), this can become impractical during tracking, and consecutive measurements might be acquired at slightly different locations. Nevertheless it can be assumed that the scale at which RF values change is of the same order as the distance covered by the tracked person or object during tracking time τ. These assumptions can imply that the probability of location error goes to 0 with increasing numbers of tracking measurements n "around" a location.

Conditional Independence of Access Points

Note that the fingerprint definition and the conditional independence given location/does not necessarily imply, in the case of vector measurements $S_l = \{S_{l,1}, \ldots, S_{l,J}\}$ and of a set S of J-dimensional vectors, that the following assumption holds:

$$p_l(S_l) = \prod_{j=1}^{J} p_l(S_{l,j}) \qquad (7)$$

Because the system and software for acquiring RSSI signal most likely queries and receives answers from APs independently, this assumption is however made.

Exemplary Embodiment 1

2D Office Space with Dense Fingerprinting

Figure 3:
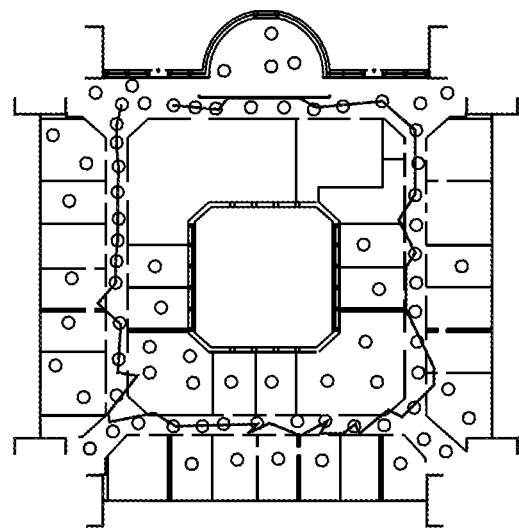
FIG. 3 shows a representation of a 2D office space with a tracked device route, according to embodiments.
Figure 4:
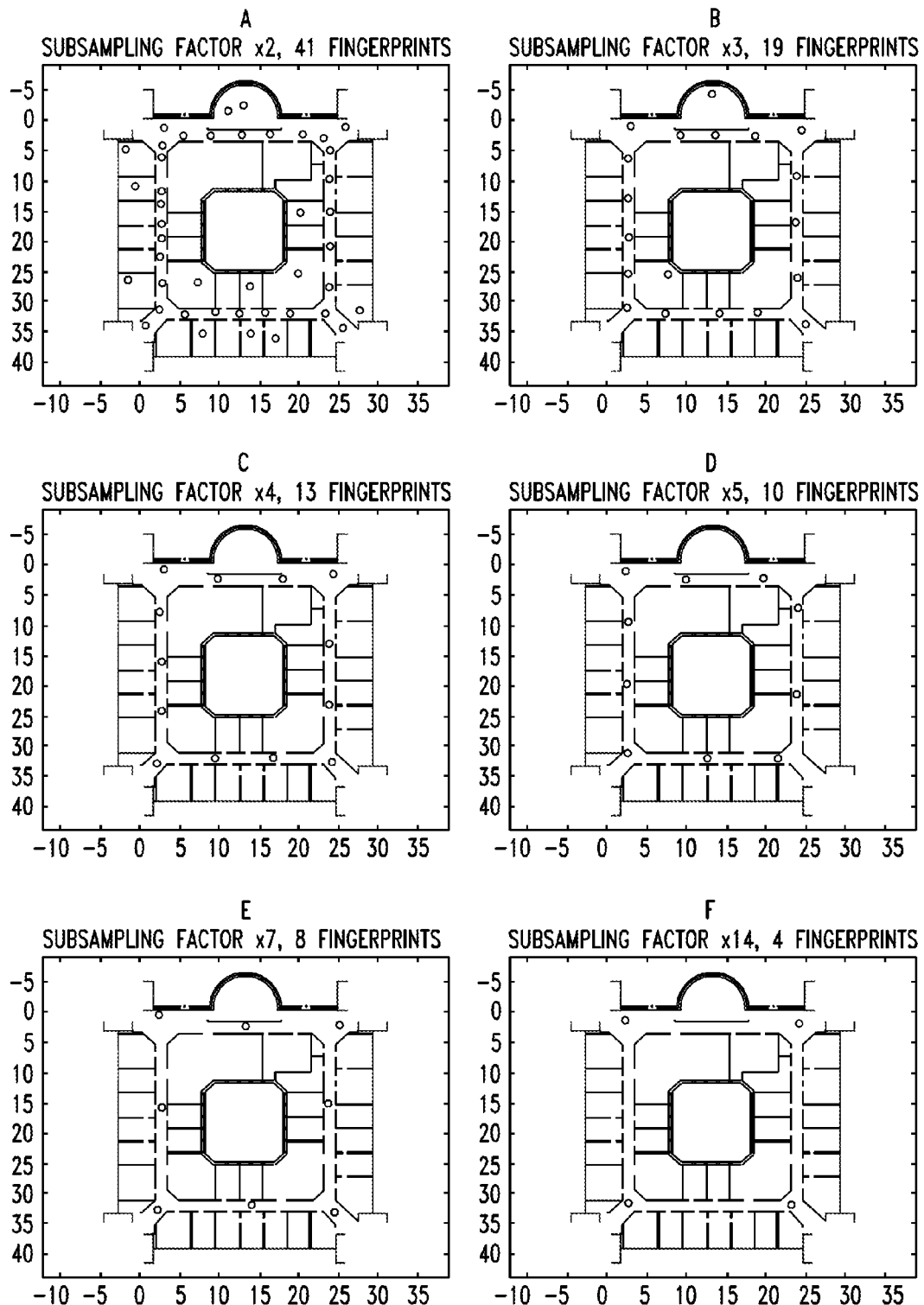
FIGS. 4A-F show representations of 2D office space and various sub-sampling factors.
Figure 5:
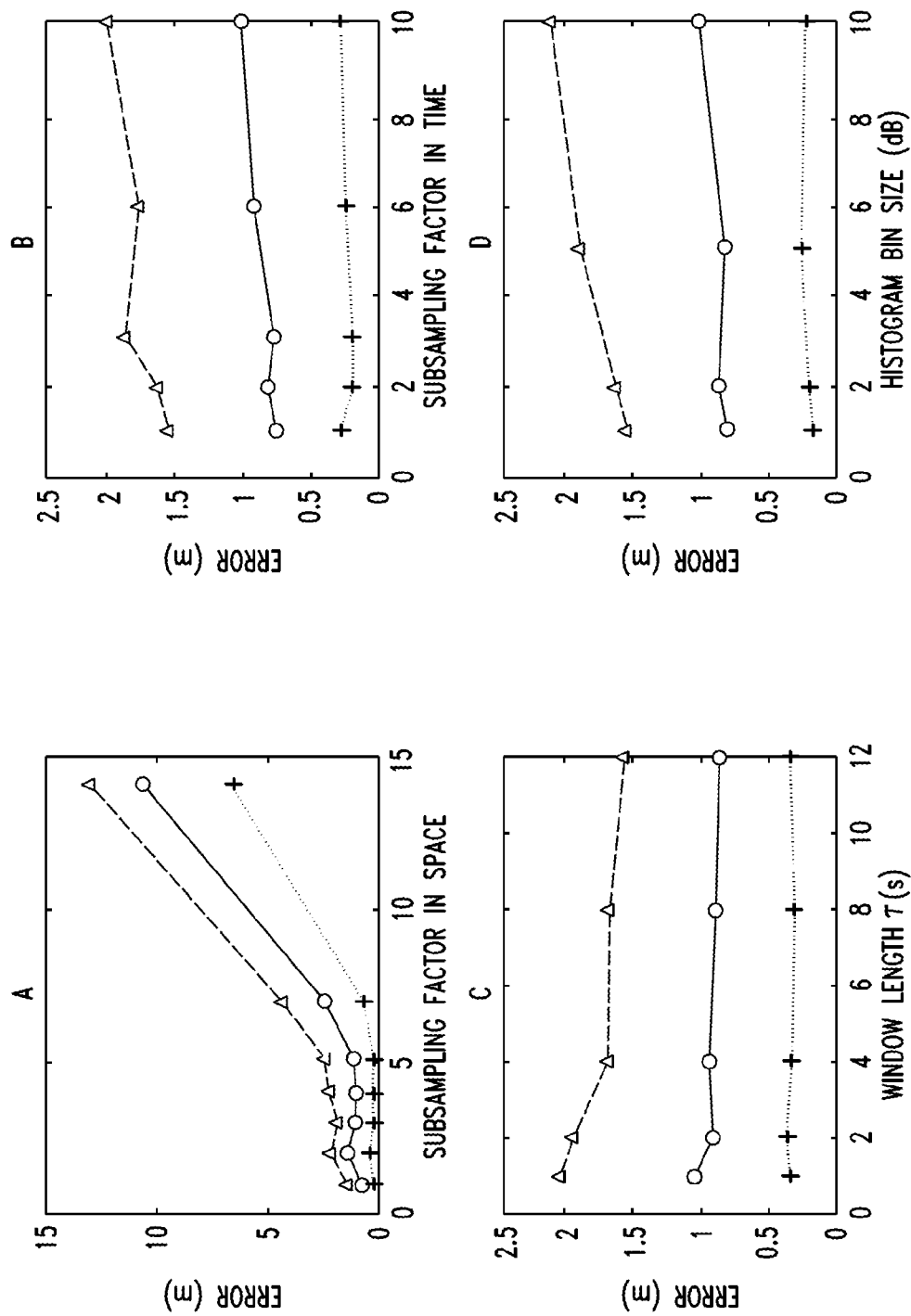
FIGS. 5A-D are graphs showing sub-sampling factor in space, sub-sampling factor in time, window length and histogram bin size, according to embodiments.

In embodiment 1, a 2D office dataset was used, consisting of a 40 m×40 m area, shown in FIG. 3. The training data consisted of 88 fingerprints recorded for 22 APs; some APs had 130 samples for each location. 4 APs only were used in the experiments. Tracking data in the dataset was acquired a few days later.

Localization Based on RSSI Distributions

Using leave out-last cross-validation on the training data, an optimal coefficient α in the KL-divergence kernel function (Eq. 3) was selected, as was the optimal number of nearest neighbor fingerprints K for kernel regression, both when using 4 APs and when using 22 APs. The optimal a when using all fingerprints for regression for both numbers of APs was also selected. Tracking data were re-calibrated as discussed above. As shown in Table I, a median accuracy of about 1.06 m was achieved, when using the optimal number of nearest neighbors (K=3) for kernel regression. As was shown in FIG. 3, the estimated trajectory is reasonably smooth. It is noted that even using the location of only one nearest neighbor (based on the KL-divergence) still yields good tracking performance at about 1.25 m. A further decrease in the median tracking error was observed when using 22 APs rather than 4 APs, as shown in Table II. For example, the 90% quantile error was reduced to around 1.7 m from over 2.3 m, and the median error was reduced to about 0.9 m from 1 m after including all the available 22 access points. Note that those 18 additional APs were part of the ambient RF "noise"; unlike the 4 APs that were specifically set up for the experiment, those APs may have been placed in different parts of the building, on different floors, or in individual offices.

TABLE 1

| Technique | Median accuracy | Accuracy at 90% |
| --- | --- | --- |
| KL divergence, 1NN | 1.25 m | 3.18 m |
| KL divergence, 3NN WKR | 1.06 m | 2.34 m |
| KL divergence, 88NN WKR | 1.14 m | 1.98 m |

TABLE 2

| Technique | Median accuracy | Accuracy at 90% |
| --- | --- | --- |
| With RSSI, 1NN | 1.16 m | 2.84 m |
| With RSSI, 6 NN WKR | 0.96 m | 1.88 m |
| With RSSI, 88 NN WKR | 0.96 m | 1.72 m |
| No RSSI, 1 NN | 1.94 m | 4.95 m |
| No RSSI, 27 NN WKR | 1.90 m | 4.31 m |
| No RSSI, 88 NN WKR | 1.90 m | 4.40 m |

Effects of Fingerprinting and Tracking Hyper-Parameters

When considering the disclosed embodiments, four different questions pertaining to parameters related to fingerprints and to tracking might be of interest to those of skill in the art. For example: 1) How many fingerprinting locations should be chosen? 2) How many RSSI samples N should be measured to estimate the location-specific fingerprint distributions $q_l(S)$? 3) During tracking, how many RSSI samples n should be used in the localization algorithm, assuming that the sampling frequency f is given and that the motion speed cannot be controlled? In other words, how long should be the sampling window τ=n/f? and 4) How wide should the histogram bins be that are used to encode the RSSI distributions? The effects of each of these four hyper-parameters can be quantified in terms of tracking accuracy with the 2D office data. In particular, the impact of: 1) Reducing the number of fingerprinting locations by sub-sampling them in space (see FIGS. 4A-F), using inter-fingerprint sub-sampling factors of 2, 3, 4, 5, 7 and 14. 2) Reducing the number of RSSI samples used to estimate the distributions at each location, using sub-sampling factors of 2, 3, 6 and 10 was used. There were at most N=130 samples per fingerprint location per AP; at a subsampling factor of 10, that number was reduced to at most N=13. 3) Changing the sampling window length τ during tracking, taking values of 1 s, 2 s, 4 s, 8 s and 12 s. Given that the motion speed was about 0.5 m/s and the sampling frequency f=5 Hz, this sampling window corresponded to n=5; 10; 20; 40; 60 samples and approximately 0.5 m, 1 m, 2 m, 4 m and 6 m, respectively. And 4) Changing the histogram bin size from 1 dB (finest unit, since the RSSI are recorded as integers), to 2 dB, 5 dB and 10 dB. RSSI values ranged from −100 dB to −30 dB.

FIGS. 5A-D shows the tracking errors (at 10%, 50% and 90% quantile) for each variable, using the optimal result selected among all combinations of the remaining 3 variables. An immediate conclusion is that the more samples N per fingerprint, the more fingerprint locations, the longer the sampling window during tracking and the finer the histogram bins for fingerprints, the better the tracking accuracy, although the hyperparameters chosen for this dataset appear to have reached a plateau. From the inspection of the full results, it appears that the 2D office data could be "downgraded" a little in terms of fewer fingerprinting samples N, fewer fingerprint locations, shorter tracking sampling windows than 4 s and coarser fingerprint histogram bins, without much detriment to the tracking accuracy. For example, while the optimal tracking accuracy is about 0.83 m (median) and about 1.65 m (at 90%), for up to N=130 RSSI samples per fingerprint, 88 fingerprints, 1 dB bins and 8 s tracking windows, 1.28 m (median) and 2.59 m (at 90%) tracking error using only 19 fingerprints, up to N=22 fingerprint samples, 5 dB histogram bins and 1 s-long tracking windows can still be obtained. Another observation is that the worst cases are when the number of fingerprints, the number of fingerprinting samples N and the number of tracking samples n are all low and the histogram bins are narrow. Finally, when there are few fingerprint locations, then coarse histogram bins and long tracking sampling windows can help reduce the error rate. In summary, these results suggest that the spatial density of fingerprints is the most important performance impacting factor. In comparison, repeated measurements at each location are less important—the advantage of multiple measurements at the same location flattens beyond about 20 samples. Optimal bin sizes for the histograms vary with the length of the sampling window during tracking—more refined bins appear useful with longer tracking windows that accumulate more samples to estimate the RSSI distribution.

Exemplary Embodiment 2

Localization Based on Access Point Visibility

Figure 6A:
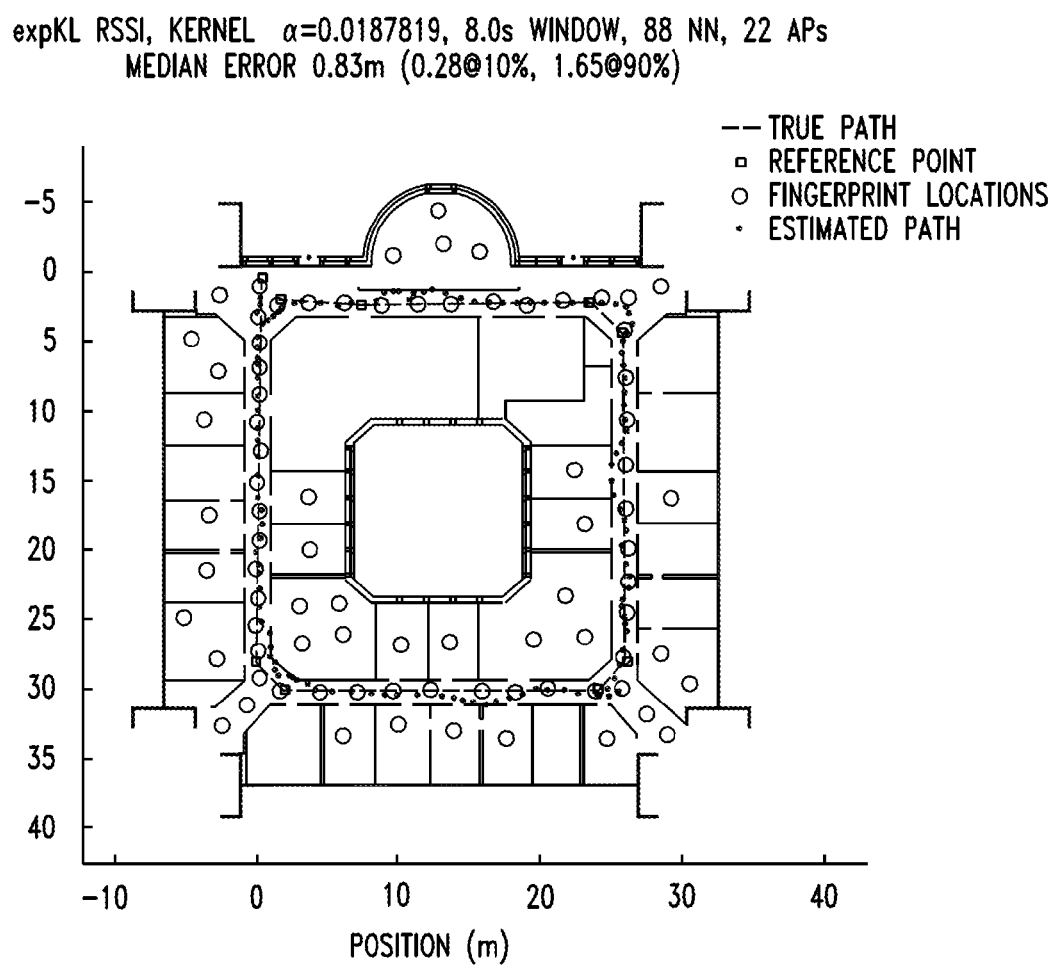
FIGS. 6A-B show representations of a 2D office space with access points marked, according to embodiments.
Figure 6B:
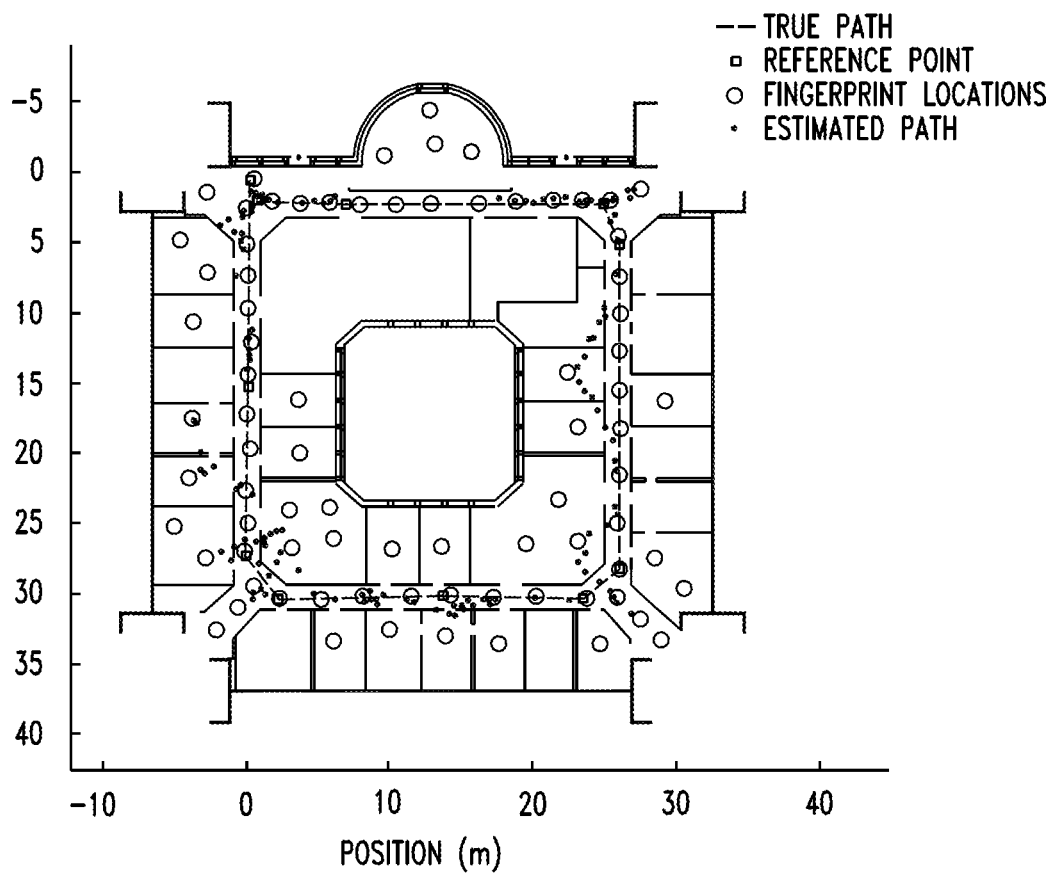

In a second series of experiments on the same office dataset, as in Embodiment 1, the RSSI from the APs was ignored, and only multinomials of AP connections were used to build the KL-divergence kernels. As shown in Table II and in FIGS. 6A-B, the tracking accuracy remained decent, at about 2 m median error.

The KL-divergence kernel regression can be extended to accommodate AP connection histograms (i.e. multinomials of the number of connections for each AP during time window ac). Even though the actual RSSI levels can be ignored, as shown, a median accuracy of 2 to 3 m in an office environment can be achieved.

In these embodiments, the method can forego RSSI recalibration completely, e.g., what APs are seen might be similar across devices, even if the RSSI levels change. It is suggested to remove, from all histograms, the APs that do not show up during tracking. Alternatively, if through software and at training time the APs are ad-hoc or part of the infrastructure, this information can be used to filter out mobile phones acting as hot spots. Other methods of filtering out APs, could be to weed out devices with short ranges.

Exemplary Embodiment 3

Fingerprinting "on the Fly" while Walking

Figure 7A:
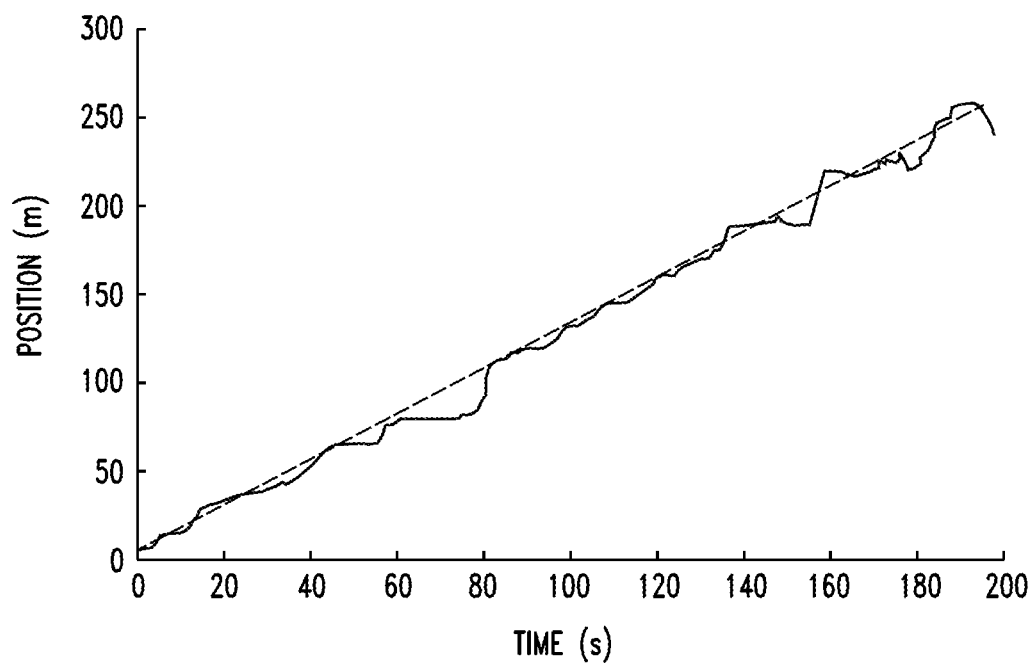
FIGS. 7A-B show graphical results of tracking a device, according to embodiments.
Figure 7B:
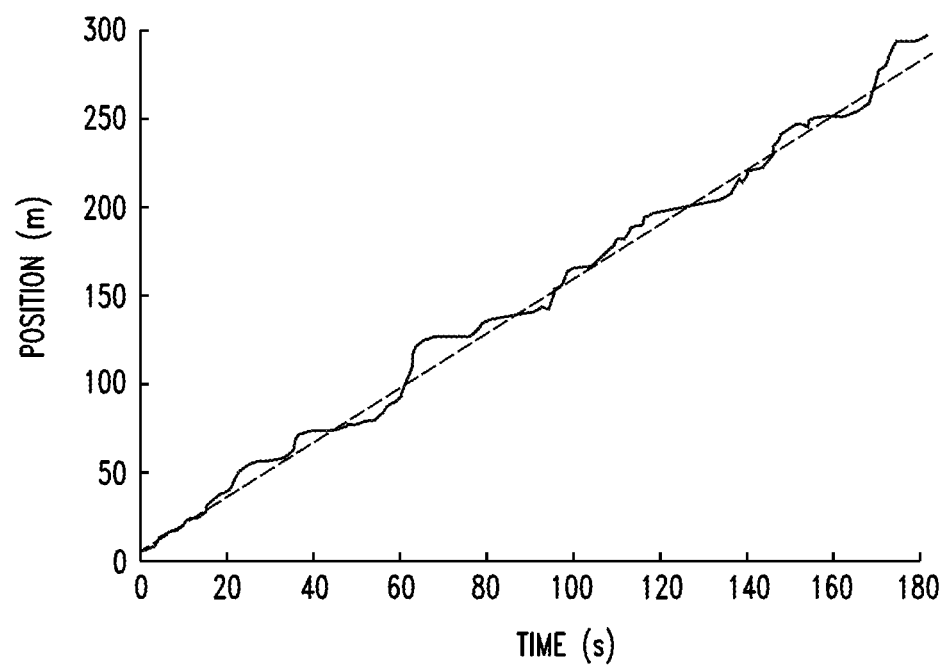

A less favorable training scenario is when fingerprinting is done "on the fly" while walking. This allows for dense spatial coverage if the RSSI queries can be made sufficiently frequent, if the walk is slow, and if the trajectory covers the space evenly. However, only one sample can be acquired for each location. The lack of repeated measurements means that the RSSI distribution at each location cannot be reliably estimated unless multiple measurements are pooled from neighboring locations. But the spread of the pooled locations introduces more variability in the RSSI values. Localization using only AP visibility can provide a more robust option. A simple method would use the binary vector of AP visibility at each location as fingerprints, whereas during tracking, position would be determined by nearest-neighbor matching to those binary vectors. To apply KL-divergence regression to this data, AP visibility vectors from consecutive locations covered by the walk over a small temporal window, were pooled and used to estimate a distribution of AP connections for the location at the center of the window. This scenario was tested in a walk at constant speed (around 1.4 m/s) along a corridor that is about 2 m wide but extends to 260 m in length. NetStumbler software queried APs only at 1 Hz. 8 s-long sampling windows were used to create 55 fingerprints (that are AP connection histograms) spaced every 4 s (i.e. every 5.5 m) for the 130 APs discovered "on the fly". The RSSI values were ignored and multinomial histograms of AP visibility were recorded. The fingerprints were used later on the same day (while in motion at 1.4 m/s), and 3.3 m median accuracy (9 m at 90%) was achieved, which compares with 5.2 m median accuracy (15 m at 90%) for 3-NN on 1 s-long binary vector fingerprints. Keeping the same AP fingerprints, the tracking test was repeated one week later and a 4 m median accuracy (7.6 m at 90%) was achieved, in spite of some APs that had disappeared in the meantime. The tracking results are shown in FIGS. 7A-B. These results are upper bounds: more careful (slower) fingerprinting and accounting for speed fluctuations could bring the errors down.

Exemplary Embodiment 4

Open-Space Localization

It can be argued that a narrow and long corridor is an ideal layout for localization. In this exemplary embodiment, the results of two trials were compared, one made in a large, open indoor space (an auditorium with over 200 seats), and another one in a narrow hallway, using the same equipment and training strategy. In both trials, fingerprints were collected at locations spread evenly over the space, and repeated measurements were made at each location.

Stop-and-Go Fingerprinting in an Auditorium

Figure 8:
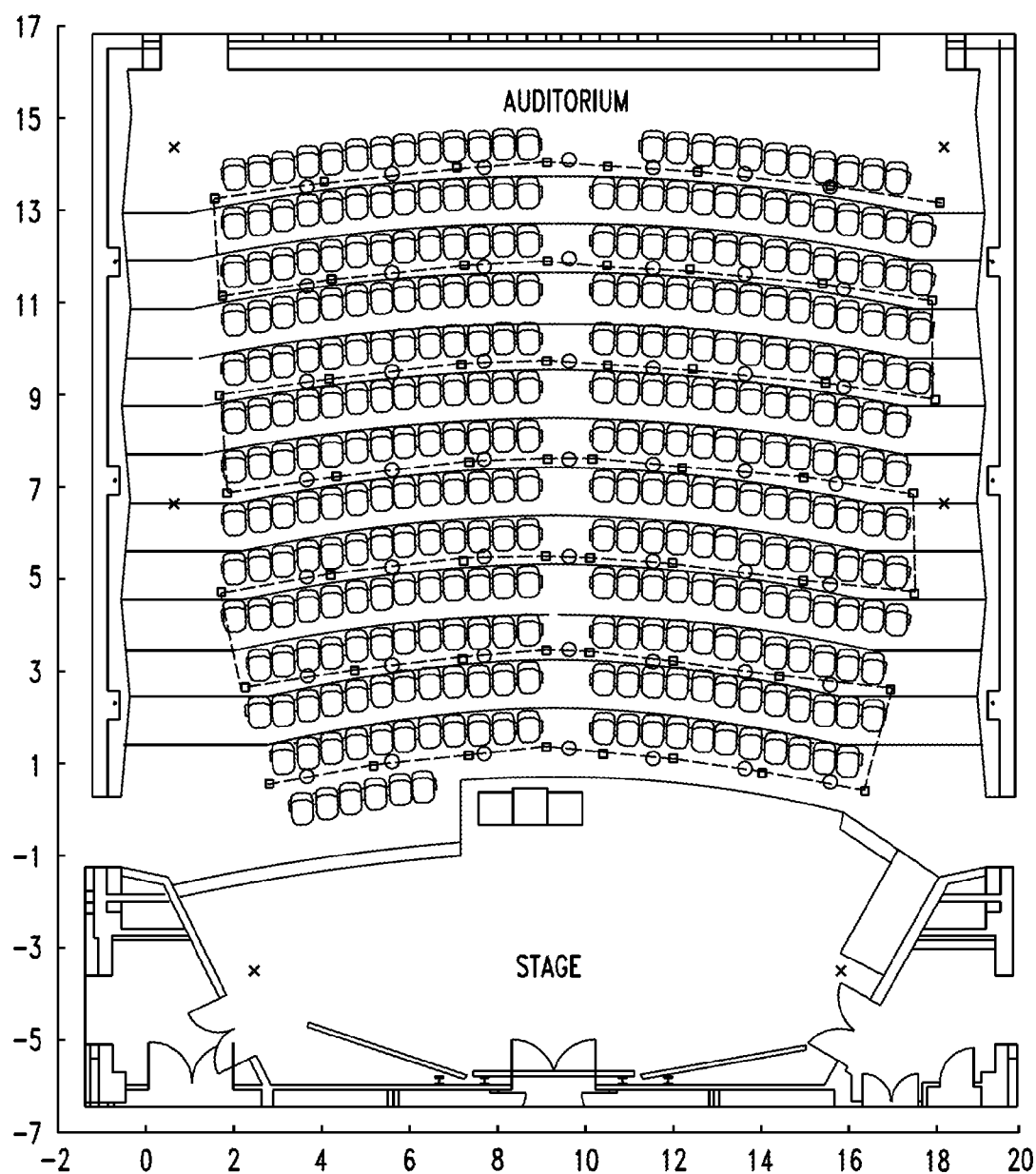
FIG. 8 shows a representation of an auditorium with a tracked device route; according to embodiments.

During training in the auditorium experiment, RSSI values from 6 APs were recorded at 49 fingerprint locations using NetStumbler software at the frequency of 1 Hz. Tracking RSSI on a path going through all the fingerprints on the next day was recorded, moving slowly at about 0.17 m/s. FIG. 8 shows the locations of the fingerprints and the path for tracking. Best results obtained were about 4.65 m median accuracy (10.23 m at 90%), using about t=10 s long tracking windows, K=3 nearest neighbor Weighted Kernel Regression and a kernel coefficient $\alpha=0.51$. To determine whether the localization results are sufficiently informative, they were compared with two random localization schemes, one consisting in randomly permuting the tracking locations every 2 s, another in generated random walks within the tracking area and at the same speed, and their median accuracy could be between about 8 m and about 9 m, and the error at 90% could be about 14 m to about 15 m. It was concluded that the method does somewhat work in open space areas, though with an accuracy that is lower than in corridors.

Exemplary Embodiment 5

Stop-and-Go Fingerprinting in a Corridor

Figure 9:
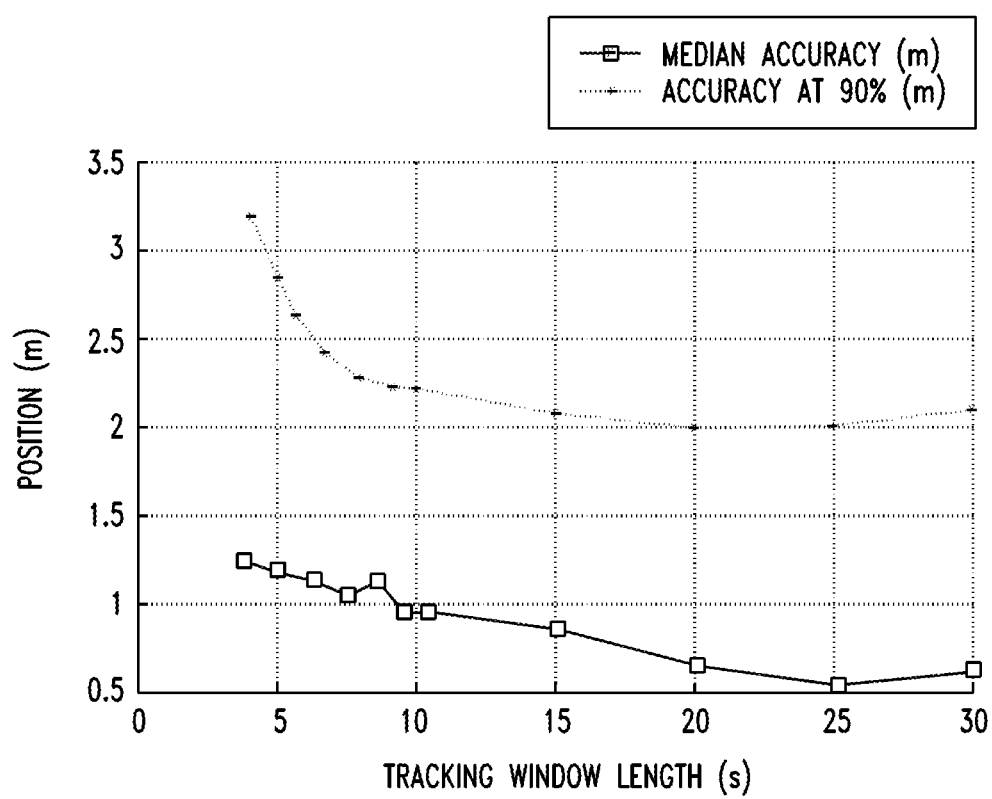
FIG. 9 shows a graph of localization error versus tracking window length, according to embodiments.
Figure 10:
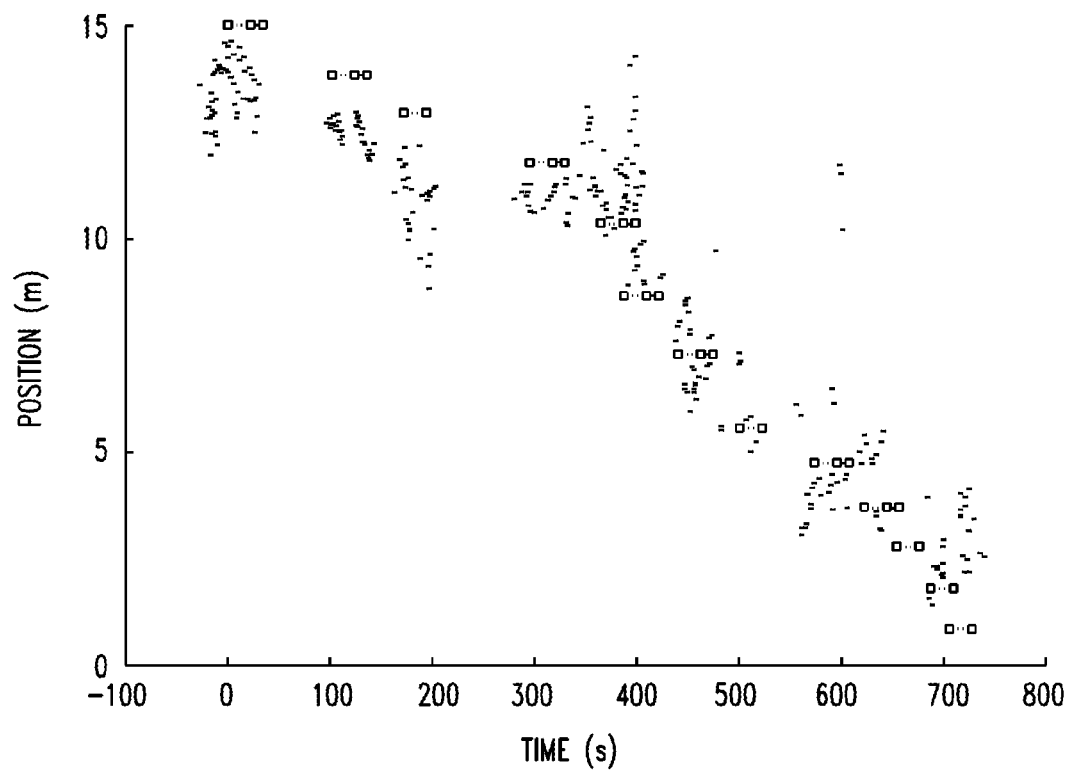
FIG. 10 shows a graph of position versus time, according to embodiments.

The results in the auditorium can be compared to a control experiment using the same equipment in a 18 m-long corridor. In that control experiment, 4 APs (taken among the 6 APs used in the auditorium) were set up, and 15 fingerprint locations spaced by about 1 m were defined, and each location was fingerprinted for 120 s. The RSSI was then tracked twice by moving between the fingerprint positions and staying there for 120 s, once in the forward direction, then backwards. The KL-divergence-based localization algorithm used K=3 nearest-neighbor regression, kernel coefficients respectively equal to $\alpha=0.06$ and $\alpha=0.11$, with tracking sampling windows of length $\tau=4$ s through $\tau=30$ s. FIGS. 9 and 10 show that the median tracking error can go well below about 1 m (median) and reach about 2 m (at 90%) in a corridor environment.

Exemplary Embodiment 6

Localization with Sparse Fingerprinting in a Complex Public Space

The last exemplary embodiment involves a realistic, almost worst-case scenario, where the building layout includes both corridors and open spaces on two floors, and there is continuous pedestrian traffic throughout the space during both fingerprinting and tracking. Fingerprints were collected at 162 locations covering both floors, and the locations were about 5.5 m apart from each other on average. Location errors of the order of about 5 m were frequent. 10-15 repeated measurements were obtained at each location. During tracking, samples were pooled over a window of about 10 s. Two options of the method were used: 1) RSSI (on a PC running NetStumbler) and 2) AP visibility only (on a Mac running WiFi Scanner). The results are detailed in Table III. It can be seen that the experimental conditions in this scenario are stretching the limits of the method.

TABLE 3

| Technique | Sampler | Floor | Median | At 90% | Floor |
|---|---|---|---|---|---|
| With RSSI | NetStumbler | Lower | 8.2 m | 16.9 m | 96.2% |
|  |  | Upper | 9 m | 17.1 m | 83.8% |
| No RSSI | WiFi Scanner | Lower | 10.3 m | 24.3 m | 89% |
|  |  | Upper | 9.1 m | 17 m | 92.6% |

Figure 11:
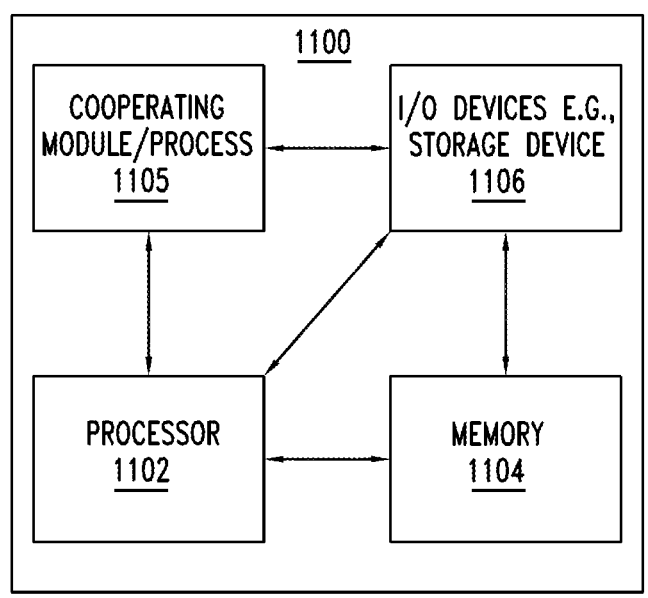
FIG. 11 is a block diagram of a controller, according to embodiments.

FIG. 11 depicts a high-level block diagram of a computer suitable for use in performing functions described herein. In particular, this computer is suitable for implementation as a server programmed with the embodiments.

As depicted in FIG. 11, computer 1100 includes a processor element 1102 (e.g., a central processing unit (CPU) and/or other suitable processor(s)) and a memory 1104 (e.g., random access memory (RAM), read only memory (ROM), and the like). The computer 1100 also may include a cooperating module/process 1105 and/or various input/output devices 1106 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)). It is noted that one or more of the above components can be present.

It will be appreciated that the functions depicted and described herein may be implemented in software in conjunction with associated hardware (e.g., via implementation of software on one or more processors that access associated memory) and/or hardware (e.g., using a general purpose computer, one or more application specific integrated circuits (ASIC), and/or any other hardware equivalents).

It will be appreciated that the functions depicted and described herein may be implemented in software for executing in conjunction with a general purpose computer (e.g., via execution by one or more processors that access associated memory) so as to implement a special purpose computer, and/or may be implemented in hardware (e.g., using one or more application specific integrated circuits (ASIC) and/or one or more other hardware equivalents).

In one embodiment, the cooperating process 1105 can be loaded into memory 1104 and executed by processor 1102 to implement functions as discussed herein. Thus, cooperating process 1105 (including associated data structures) can be stored on a computer readable storage medium, e.g., RAM memory, magnetic or optical drive or diskette, and the like.

It will be appreciated that computer 1100 depicted in FIG. 11 provides a general architecture and functionality suitable for implementing functional elements described herein and/or portions of functional elements described herein.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. As used herein, the term "and/or" with respect to a listing of items such as, for example, A and/or B, means A alone, B alone, or A and B. Those skilled in the art will recognize that these and other variations are possible within the spirit and scope as defined in the following claims and their equivalents.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method of estimating the location of a device, comprising:
   sampling a measurement distribution p of a parameter of the device for a predetermined duration, by a processor;
   comparing the sampled measurement distribution p to a database of distributions $q_{1\ to\ L}$ using a symmetrized Kullback-Leibler (K-L) divergence D;
   constructing a kernel function k(p, q) using the K-L divergence D between the measured sample distribution p and a database distribution $q_i$ component across all $q_{1\ to\ L}$;
   performing a weighted regression using the constructed kernel function; and
   estimating the location of the device based on the performed weighted regression of the constructed kernel function.

2. The method of claim 1, wherein the sampling a measurement distribution is repeated at different locations, $p_{x,y}$.

3. The method of claim 2, wherein for each $p_{x,y}$, the comparing, constructing, performing, and estimating steps are performed.

4. The method of claim 1, wherein the measurement parameter is signal strength.

5. The method of claim 1, wherein the measurement parameter is access point presence.

6. The method of claim 1, wherein the predetermined duration ranges from approximately 1 second to approximately 20 seconds.

7. The method of claim 1, wherein the symmetrized KL divergence D is defined as:

$$D(p,q)=KL(p\|q)+KL(q\|p).$$

8. The method of claim 1, wherein the constructing the kernel, further comprises:
   exponentiating the symmetrized KL divergence D.

9. The method of claim 1, wherein the performing a weighted regression uses K nearest neighbors.

10. The method of claim 1, wherein the database comprises a set of previously mapped measurement distributions for the device parameter.

11. A tangible computer readable medium embodying programmed instructions which, when executed on a processor, are configured for performing a method, the method comprising:
    sampling a measurement distribution p of a parameter of the device for a predetermined duration, by a processor;
    comparing the sampled measurement distribution p to a database of distributions $q_{1\ to\ L}$ using a symmetrized Kullback-Leibler (K-L) divergence D;
    constructing a kernel function k(p, q) using the K-L divergence D between the measured sample distribution p and a database distribution $q_i$ component across all $q_{1\ to\ L}$;
    performing a weighted regression using the constructed kernel function; and
    estimating the location of the device based on the performed weighted regression of the constructed kernel function.

12. The tangible computer readable medium of claim 11, wherein the sampling a measurement distribution is repeated at different locations, $p_{x,y}$.

13. The tangible computer readable medium of claim 12, wherein for each $p_{x,y}$ the comparing, constructing, performing, and estimating steps are performed.

14. The tangible computer readable medium of claim 11, wherein the measurement parameter is signal strength.

15. The tangible computer readable medium of claim 11, wherein the measurement parameter is access point presence.

16. The tangible computer readable medium of claim 11, wherein the predetermined duration ranges from approximately 1 second to approximately 10 seconds.

17. The tangible computer readable medium of claim 11, wherein the symmetrized KL divergence D is defined as:

$$D(p,q)=KL(p\|q)+KL(q\|p).$$

18. The tangible computer readable medium of claim 11, wherein the constructing the kernel, further comprises:
 exponentiating the symmetrized KL divergence D.

19. The tangible computer readable medium of claim 11, wherein the performing a weighted regression uses K nearest neighbors.

20. The tangible computer readable medium of claim 11, wherein the database comprises a set of previously mapped measurement distributions for the device parameter.

\* \* \* \* \*